United States Patent
Short et al.

(10) Patent No.: US 8,424,416 B2
(45) Date of Patent: Apr. 23, 2013

(54) LAYSHAFT GENERATOR

(75) Inventors: Keith E. Short, Rockford, IL (US); Michael F. Cass, Rockford, IL (US); Craig R. Legros, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 158 days.

(21) Appl. No.: 12/818,535

(22) Filed: Jun. 18, 2010

(65) Prior Publication Data

US 2011/0309190 A1 Dec. 22, 2011

(51) Int. Cl.
*F16H 37/06* (2006.01)
*B64D 35/00* (2006.01)

(52) U.S. Cl.
USPC ........................ 74/665 GB; 74/423

(58) Field of Classification Search ............. 74/665 A, 74/665 B, 665 E, 665 F, 665 G, 665 GA, 74/665 GB, 665 GC
See application file for complete search history.

(56) References Cited

U.S. PATENT DOCUMENTS

| | | | | |
|---|---|---|---|---|
| 2,293,279 A * | 8/1942 | Chilton et al. | .................. | 244/60 |
| 2,462,824 A * | 2/1949 | Zimmerman et al. | .......... | 244/60 |
| 2,979,968 A * | 4/1961 | Beurer | ................. | 74/665 GA |
| 3,112,728 A * | 12/1963 | Krause | ............................. | 440/75 |
| 3,290,963 A * | 12/1966 | Oldfield et al. | ............ | 74/665 M |
| 4,118,997 A * | 10/1978 | Woodward et al. | .............. | 74/417 |
| 4,266,436 A * | 5/1981 | Reppert | ........................... | 74/395 |
| 4,344,760 A * | 8/1982 | Kulikowski | ....................... | 440/3 |
| 4,470,284 A * | 9/1984 | Noe et al. | ........................ | 72/248 |
| 4,479,619 A * | 10/1984 | Saunders et al. | ................. | 244/60 |
| 4,811,627 A * | 3/1989 | Mouille | ....................... | 74/665 L |
| 4,858,491 A * | 8/1989 | Shube | ........................ | 74/665 B |
| 5,782,433 A * | 7/1998 | Goi et al. | ........................ | 244/60 |
| 6,122,984 A * | 9/2000 | Willmot | ........................ | 74/395 |
| 6,164,259 A * | 12/2000 | Brogdon et al. | ........... | 123/192.2 |
| 6,467,725 B1 | 10/2002 | Coles et al. | | |
| 7,552,582 B2 * | 6/2009 | Eick et al. | ................. | 60/39.163 |
| 7,651,050 B2 * | 1/2010 | Lappos et al. | ............ | 244/17.11 |
| 7,654,087 B2 | 2/2010 | Ullyott | | |
| 7,690,186 B2 | 4/2010 | Dooley | | |
| 7,833,126 B2 * | 11/2010 | Venter | ............................. | 477/39 |
| 7,918,146 B2 * | 4/2011 | Gmirya | ....................... | 74/665 C |
| 2003/0127930 A1 | 7/2003 | Mackulin et al. | | |
| 2003/0205422 A1 * | 11/2003 | Morrow et al. | .............. | 180/65.2 |
| 2005/0011307 A1 * | 1/2005 | Gmirya | ....................... | 74/665 GA |
| 2006/0248900 A1 * | 11/2006 | Suciu et al. | ..................... | 60/802 |
| 2007/0137214 A1 | 6/2007 | Zewde et al. | | |
| 2007/0240427 A1 | 10/2007 | Ullyott | | |
| 2008/0060476 A1 | 3/2008 | Herlihy et al. | | |
| 2008/0148881 A1 * | 6/2008 | Moniz et al. | ................... | 74/15.6 |
| 2008/0173752 A1 * | 7/2008 | Palcic et al. | ............... | 244/17.11 |
| 2008/0211237 A1 | 9/2008 | Berenger | | |
| 2008/0314355 A1 | 12/2008 | Harju | | |

(Continued)

FOREIGN PATENT DOCUMENTS

DE 4224228 A1 2/1993

*Primary Examiner* — Ha D Ho
*Assistant Examiner* — Jude Agendia
(74) *Attorney, Agent, or Firm* — Cantor Colburn LLP

(57) ABSTRACT

An apparatus is provided and includes a rotatable shaft on which a first bevel gearbox is disposed, a layshaft on which a second bevel gearbox is disposed, the first and second bevel gearboxes being coupled to transmit shaft rotation to the layshaft, an accessory gearbox to which the layshaft and one or more accessories are coupled and a generator operably disposed on the layshaft between the second bevel gearbox and the accessory gearbox.

20 Claims, 1 Drawing Sheet

U.S. PATENT DOCUMENTS

| | | |
|---|---|---|
| 2009/0000308 A1 | 1/2009 | Cloft et al. |
| 2009/0003992 A1 | 1/2009 | Cloft |
| 2009/0272209 A1 | 11/2009 | Harju |
| 2009/0288421 A1* | 11/2009 | Zeiner et al. .............. 60/792 |
| 2009/0302152 A1 | 12/2009 | Knight |
| 2010/0000226 A1 | 1/2010 | Rensch |

* cited by examiner

LAYSHAFT GENERATOR

BACKGROUND OF THE INVENTION

The subject matter disclosed herein relates to a layshaft generator and, more particularly, a layshaft generator for use with an aircraft engine.

In conventional engines, generators convert rotational energy of an engine shaft into electricity. Where the engines are designed for use in aircrafts, the generator and, particularly, the main generator provides most if not all of the electricity for the electrical components on board. Thus, for large commercial aircraft having a large number of electrical components that demand a similarly large electrical load, the main generator is often large and heavy in order to be capable of meeting this load.

A problem exists, however, in that conventional engines are often designed in such a way that the large and heavy main generator places a cantilever load on its support structure. For example, rotation of an engine shaft is transmitted to an accessory gearbox by way of a series of bevel gearboxes and the main generator is then coupled to the accessory gearbox at a relatively large distance from the engine shaft. The main generator is thereby receptive of the rotation as having been transmitted through the accessory gearbox. With this configuration, the accessory gearbox must include a large number of gears and gear connections that are sufficiently wide enough to transfer engine shaft rotation to the main generator and it must be long enough to provide a main generator mounting.

BRIEF DESCRIPTION OF THE INVENTION

According to one aspect of the invention, an apparatus is provided and includes a rotatable shaft on which a first bevel gearbox is disposed, a layshaft on which a second bevel gearbox is disposed, the first and second bevel gearboxes being coupled to transmit shaft rotation to the layshaft, an accessory gearbox to which the layshaft and one or more accessories are coupled and a generator operably disposed on the layshaft between the second bevel gearbox and the accessory gearbox.

According to another aspect of the invention, an apparatus is provided and includes a rotatable shaft on which a first bevel gearbox is disposed, a layshaft on which a second bevel gearbox is disposed, the first and second bevel gearboxes being coupled to transmit shaft rotation to the layshaft, an accessory gearbox to which the layshaft and one or more accessories are coupled and a generator operably disposed on the layshaft between the second bevel gearbox and the accessory gearbox such that the layshaft is encompassed within the second bevel gearbox, the generator and the accessory gearbox with opposing side faces of the generator respectively abutting corresponding faces of the second bevel gearbox and the accessory gearbox.

According to yet another aspect of the invention, an aircraft engine is provided and includes a rotatable shaft on which a first bevel gearbox is disposed, a layshaft on which a second bevel gearbox is disposed, the first and second bevel gearboxes being coupled to transmit shaft rotation to the layshaft, an accessory gearbox to which the layshaft and one or more accessories are coupled and a main engine generator to generate electricity for electrical aircraft components, which is operably disposed on the layshaft between the second bevel gearbox and the accessory gearbox such that the layshaft is encompassed within the second bevel gearbox, the generator and the accessory gearbox.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
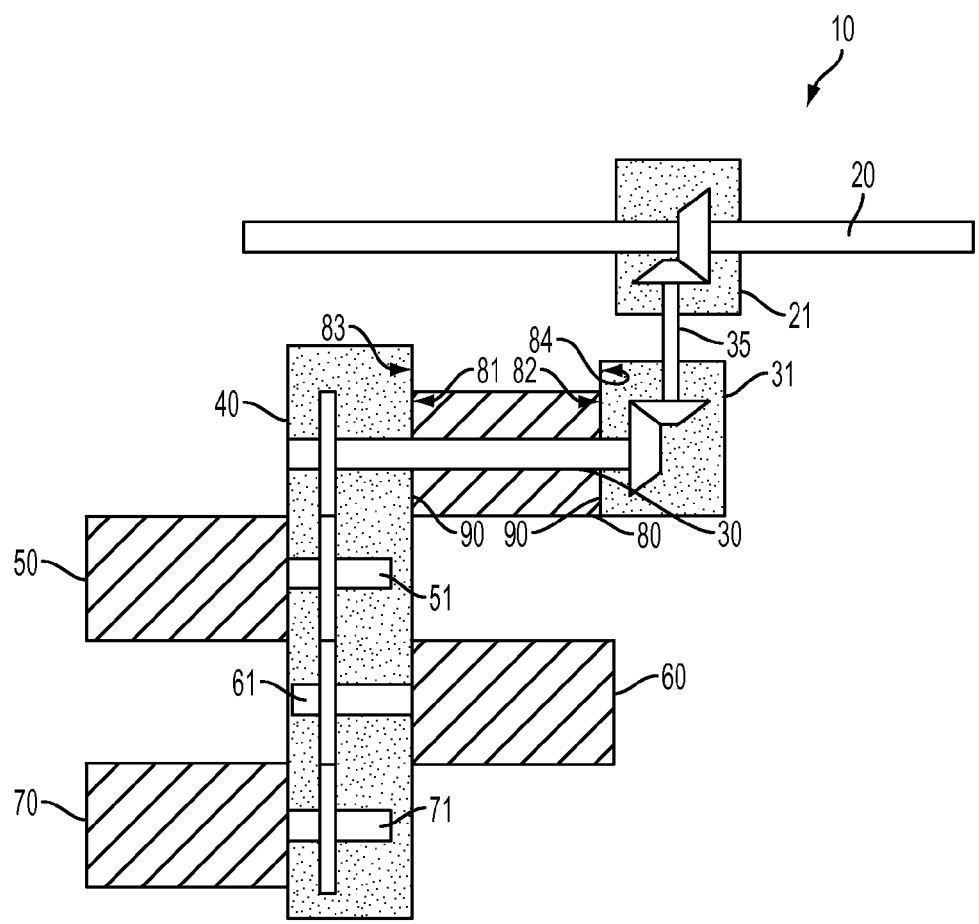
FIG. 1 is a schematic diagram of a portion of an aircraft engine.
Figure 2:
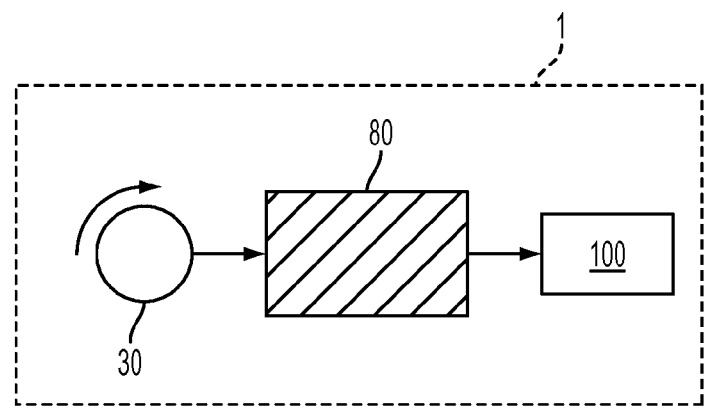
FIG. 2 is a schematic diagram of an operation of a main generator of the aircraft engine of FIG. 1.

With reference to FIGS. 1 and 2 and, in accordance with aspects of the present invention, an apparatus 1, such as an aircraft engine 10 is provided. The aircraft engine 10 includes a rotatable engine shaft 20 on which a first bevel gearbox 21 is disposed and a layshaft 30 on which a second bevel gearbox 31 is disposed. The first and second bevel gearboxes 21 and 31 are coupled with one another via secondary shaft 35 to thereby transmit shaft rotation from the engine shaft 20 to the layshaft 30.

The aircraft engine 10 further includes an accessory gearbox 40 to which the layshaft 30 and one or more accessories 50, 60 and 70 are coupled. In addition, a main engine generator 80 is also coupled to the accessory gearbox 40. The main engine generator 80 is operably disposed on the layshaft 30 between the second bevel gearbox 31 and the accessory gearbox 40 such that the layshaft 30 is substantially entirely encompassed within the second bevel gearbox 31, the main engine generator 80 and the accessory gearbox 40. With this configuration, the main engine generator 80 converts layshaft 30 rotation into generated electricity for electrical aircraft components 100.

The first bevel gearbox 21 may include an upper bevel gearbox and the second bevel gearbox 31 may include a lower bevel gearbox. The first and second bevel gearboxes 21 and 31 may be oriented such that engine shaft 20 and the layshaft 30 are substantially parallel with one another.

The accessories 50, 60 and 70 may include any one or more of an exhaust pump, a fuel pump and a secondary generator. The accessory gearbox 40 may include a number of gear connections 51, 61 and 71 that corresponds to a number of the one or more accessories 50, 60 and 70. Thus, if three accessories are coupled to the accessory gearbox 40, the number of gear connections is also three, although it is understood that the gear connections may each include multiple individual gears. In this way, additional gear connections, such as a jacking shaft and other similar components that would be required for coupling the main engine generator 80 to the accessory gearbox 40 at the distal end of the accessory gearbox 40 remote from the engine shaft 20, in accordance with a conventional design, are unnecessary. As such, a thickness of the gears of the gear connections 51, 61 and 71 can be reduced, along with an overall weight, size and length of the accessory gearbox 40. Moreover, an amount of power required to be transmitted to the accessory gearbox 40 can be similarly reduced.

In embodiments of the invention, the main engine generator 80 may be substantially coaxial with the layshaft 30. Also, the layshaft 30 may be encompassed within the second bevel gearbox 31, the main engine generator 80 and the accessory gearbox 40 such that no portion of the layshaft 30 is exposed to an exterior. This may be accomplished, for example, by opposing side faces 81 and 82 of the main engine generator 80 respectively abutting corresponding faces 83 and 84 of the accessory gearbox 40 and the second bevel gearbox 31. Here, the abutment of the opposing side faces 81 and 82 with the corresponding faces 83 and 84 may form an oil leakage seal 90 that prevents leakage of oil and may negate a need for additional sealant or the installation of leak preventing components about the layshaft 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
   a rotatable shaft on which a first bevel gearbox is disposed;
   a layshaft on which a second bevel gearbox is disposed, the first and second bevel gearboxes being coupled to transmit shaft rotation to the layshaft;
   an accessory gearbox to which the layshaft and one or more accessories are coupled; and
   a generator operably disposed on the layshaft between the second bevel gearbox and the accessory gearbox.

2. The apparatus according to claim 1, wherein the first bevel gearbox comprises an upper bevel gearbox and the second bevel gearbox comprises a lower bevel gearbox.

3. The apparatus according to claim 1, wherein the shaft and the layshaft are substantially parallel.

4. The apparatus according to claim 1, wherein the accessories comprise an exhaust pump, a fuel pump and a secondary generator.

5. The apparatus according to claim 1, wherein the accessory gearbox comprises a number of gears that corresponds to a number of the one or more accessories.

6. The apparatus according to claim 1, wherein the generator is substantially coaxial with the layshaft.

7. The apparatus according to claim 1, wherein the layshaft is encompassed within the second bevel gearbox, the generator and the accessory gearbox.

8. The apparatus according to claim 1, wherein opposing side faces of the generator respectively abut corresponding faces of the second bevel gearbox and the accessory gearbox.

9. The apparatus according to claim 8, wherein the abutment of the opposing side faces of the generator with the corresponding faces of the second bevel gearbox and the accessory gearbox forms an oil leakage seal.

10. The apparatus according to claim 1, wherein the generator comprises a main engine generator to generate electricity for electrical aircraft components.

11. An apparatus, comprising:
    a rotatable shaft on which a first bevel gearbox is disposed;
    a layshaft on which a second bevel gearbox is disposed, the first and second bevel gearboxes being coupled to transmit shaft rotation to the layshaft;
    an accessory gearbox to which the layshaft and one or more accessories are coupled; and
    a generator operably disposed on the layshaft between the second bevel gearbox and the accessory gearbox such that the layshaft is encompassed within the second bevel gearbox, the generator and the accessory gearbox with opposing side faces of the generator respectively abutting corresponding faces of the second bevel gearbox and the accessory gearbox.

12. The apparatus according to claim 11, wherein the abutment of the opposing side faces of the generator with the corresponding faces of the second bevel gearbox and the accessory gearbox forms an oil leakage seal.

13. An aircraft engine, comprising:
    a rotatable shaft on which a first bevel gearbox is disposed;
    a layshaft on which a second bevel gearbox is disposed, the first and second bevel gearboxes being coupled to transmit shaft rotation to the layshaft;
    an accessory gearbox to which the layshaft and one or more accessories are coupled; and
    a main engine generator to generate electricity for electrical aircraft components, which is operably disposed on the layshaft between the second bevel gearbox and the accessory gearbox such that the layshaft is encompassed within the second bevel gearbox, the main engine generator and the accessory gearbox.

14. The apparatus according to claim 13, wherein the first bevel gearbox comprises an upper bevel gearbox and the second bevel gearbox comprises a lower bevel gearbox.

15. The apparatus according to claim 13, wherein the shaft and the layshaft are substantially parallel.

16. The apparatus according to claim 13, wherein the accessories comprise an exhaust pump, a fuel pump and a secondary generator.

17. The apparatus according to claim 13, wherein the accessory gearbox comprises a number of gears that corresponds to a number of the one or more accessories.

18. The apparatus according to claim 13, wherein the main engine generator is substantially coaxial with the layshaft.

19. The apparatus according to claim 13, wherein opposing side faces of the main engine generator respectively abut corresponding faces of the second bevel gearbox and the accessory gearbox.

20. The apparatus according to claim 19, wherein the abutment forms an oil leakage seal.

\* \* \* \* \*